United States Patent
Masson et al.

(10) Patent No.: US 10,234,943 B2
(45) Date of Patent: Mar. 19, 2019

(54) ACCESS CONTROL METHOD BY HAPTIC FEEDBACK

(71) Applicant: Orange, Paris (FR)

(72) Inventors: Cecile Masson, Grenoble (FR); Tomas Perez Segovia, Saint Martin d'Heres (FR); Sophie Zijp-Rouzier, La Tronche (FR); Gregoire Lefebvre, Crolles (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/634,337

(22) Filed: Feb. 27, 2015

(65) Prior Publication Data

US 2015/0248162 A1    Sep. 3, 2015

(30) Foreign Application Priority Data

Feb. 28, 2014    (FR) ...................................... 14 51619

(51) Int. Cl.
| | |
|---|---|
| *G06F 3/01* | (2006.01) |
| *G06F 21/31* | (2013.01) |
| *G06F 21/36* | (2013.01) |
| *G06F 3/041* | (2006.01) |

(52) U.S. Cl.
CPC .............. *G06F 3/016* (2013.01); *G06F 3/017* (2013.01); *G06F 3/0412* (2013.01); *G06F 21/31* (2013.01); *G06F 21/316* (2013.01); *G06F 21/36* (2013.01); *G06F 2203/04101* (2013.01); *G06F 2203/04104* (2013.01); *G06F 2203/04808* (2013.01); *G06F 2203/04809* (2013.01);

(Continued)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | |
|---|---|---|---|
| 7,982,588 B2 | 7/2011 | Makinen et al. | |
| 8,504,842 B1 | 8/2013 | Meacham | |
| 9,858,409 B2 * | 1/2018 | Boss ........................ | G06F 21/45 |

(Continued)

FOREIGN PATENT DOCUMENTS

| | | |
|---|---|---|
| GB | 2476822 A | 7/2011 |
| WO | 2007096648 A1 | 8/2007 |

OTHER PUBLICATIONS

French Search Report and Written Opinion dated Oct. 23, 2014 for corresponding French Application No. 1451619, filed Feb. 28, 2014.

(Continued)

*Primary Examiner* — William Lu
(74) *Attorney, Agent, or Firm* — David D. Brush; Westman, Champlin & Koehler, P.A.

(57) ABSTRACT

An access control method is performed on an equipment item linked to elements for rendering at least one haptic signal on a haptic rendering surface, wherein the haptic signal is a touch-discernible texture. The method includes, after an access request has been obtained: ordering rendering of a haptic signal; obtaining information on detection of a gesture of response to the signal; of validating the gesture of response when the gesture detected corresponds to a gesture previously associated with the haptic signal rendered; and authorizing access following the validation of the gesture.

9 Claims, 6 Drawing Sheets

(52) U.S. Cl.
CPC ........... *G06F 2221/2103* (2013.01); *G06F 2221/2133* (2013.01); *G06F 2221/2141* (2013.01)

(56) References Cited

U.S. PATENT DOCUMENTS

| | | | | |
|---|---|---|---|---|
| 2010/0231550 | A1* | 9/2010 | Cruz-Hernandez | G06F 3/0488 345/174 |
| 2011/0021272 | A1* | 1/2011 | Grant | A63F 13/10 463/30 |
| 2011/0187497 | A1* | 8/2011 | Chin | H04L 9/32 340/5.54 |
| 2011/0260829 | A1* | 10/2011 | Lee | G06F 3/0414 340/5.51 |
| 2011/0300831 | A1* | 12/2011 | Chin | G06F 1/3203 455/411 |
| 2012/0276871 | A1* | 11/2012 | Tanioka | G06F 21/36 455/411 |
| 2013/0069772 | A1 | 3/2013 | Najafi et al. | |
| 2013/0113723 | A1 | 5/2013 | Chen et al. | |
| 2013/0318437 | A1* | 11/2013 | Jung | G06F 3/0488 715/251 |
| 2014/0139450 | A1* | 5/2014 | Levesque | G08B 6/00 345/173 |
| 2014/0139454 | A1* | 5/2014 | Mistry | G06F 3/041 345/173 |
| 2014/0292635 | A1* | 10/2014 | Vetek | G06F 3/016 345/156 |
| 2014/0365883 | A1* | 12/2014 | Ramsay | G06F 3/016 715/702 |

OTHER PUBLICATIONS

English translation of the French Written Opinion dated Oct. 23, 2014, for corresponding French Application No. 1451619, filed Feb. 28, 2014.

* cited by examiner

ACCESS CONTROL METHOD BY HAPTIC FEEDBACK

CROSS-REFERENCE TO RELATED APPLICATIONS

This Application claims priority under the Paris Convention from French Patent Application No. 14 51619, filed Feb. 28, 2014, the content of which is incorporated herein by reference in its entirety.

TECHNICAL FIELD

The present disclosure relates to access security and relates in particular to an access control method by haptic feedback.

PRIOR ART

The massive adoption of increasingly sophisticated mobile equipment items—smartphones and tablets—is bringing with it a marked change in usages. The smartphones in particular continue to win over cell phone users, whereas the tablets are introducing new usages in the home and are increasingly competing with the traditional PC.

The users store on these terminals a large quantity of personal data, such as, for example, photos, emails, or even details of different contacts. In order to protect these data, such a terminal can be locked in such a way that the data that it contains are not accessible to unauthorized third parties. The locking of the terminal can be activated following an action on the part of a user on a button for example, or even after a certain period of inactivity. When it is locked, the functionalities of the terminal are generally restricted. Thus, to fully exploit the functionalities of the terminal and access the data that it contains, a user will have to correctly execute an access control procedure, called unlocking procedure.

According to a first unlocking method, the user is prompted to enter a password by using, for example, virtual keys represented on the touch screen of the terminal. When the password is entered correctly, the terminal is unlocked and all its functionalities become accessible.

According to another unlocking method, the user is prompted to reproduce a prerecorded pattern by moving his or her finger over a grid comprising a certain number of cells. If the pattern drawn on the grid corresponds to a pattern previously stored by the user, the terminal is unlocked and all its functionalities become accessible. As a variant, the U.S. Pat. No. 8,504,842 B1 "Alternative unlocking patterns" provides for a particular pattern to be able to be associated with a particular functionality of the terminal.

Certain terminals equipped with a front-mounted camera allow for unlocking by facial recognition. Thus, the terminal captures an image of the user and compares it with a prestored image of an authorized user. When the faces match, the terminal is unlocked.

The document US 2013/0113723 describes an unlocking method prompting the user to perform a simultaneous action at different predefined positions on the screen. For example, the terminal displays a grid on which the user must position his or her fingers. The terminal is unlocked when the fingers are correctly placed on the prestored positions.

These methods make it possible to secure the access to the terminal but present the drawback of being easy to imitate. For example, when a third party watches a user executing an unlocking procedure according to the prior art, he or she can easily reproduce the password or the pattern to access the terminal. It is also worth noting that it is easy to mislead a facial recognition unlocking system using a photograph.

The patent application US 2012/276871 A1 discloses a method making it possible to unlock a mobile terminal by combining codes and haptic signals such as vibrations. This method presents a drawback in that the vibrations are propagated to all of the terminal and, when the latter is for example placed on a table, the vibrations become audible to a nearby third party.

There is therefore a real need for an access control system which cannot easily be imitated by a third party watcher having seen a user correctly execute the procedure.

SUMMARY

An exemplary embodiment of the present disclosure relates, according to a first aspect, to an access control method on an equipment item linked to means for rendering at least one haptic signal on a haptic rendering surface, the method being such that the haptic signal is a touch-discernible texture and that it comprises, after an access request has been obtained, steps of ordering rendering of a haptic signal; of obtaining information on detection of a gesture of response to said signal; of validating the gesture of response when the gesture detected corresponds to a gesture previously associated with the haptic signal rendered; and of authorizing access following the validation of said gesture.

An exemplary embodiment of the present disclosure thus proposes transmitting touch sensations to the user by means of a haptic feedback device linked to the equipment item, the haptic feedback device being suitable for rendering at least one prestored haptic signal. The duly rendered haptic signal is perceived by the user in the form of a touch sensation, and can, for example, correspond to the rendering of a texture to the skin of the user, to the transmission of vibrations, of tingling sensations, or even of heat. Hereinafter in this document, it will be considered, in a nonlimiting manner, that the haptic feedback is produced by a rendering of texture on a haptic rendering surface. However, the attention of the reader is drawn to the fact that any type of haptic feedback suitable for transmitting a touch sensation to the user can be used in the context of the present disclosure.

It is thus possible to control the access to an equipment item by checking that the gesture performed by the user in response to the haptic signal presented does indeed correspond to a gesture associated previously, for example on first use of the equipment item. Unlike in the prior art, a third party having watched the user execute the access control procedure will be unable to reproduce it, because only the user handling the equipment item can feel and identify the haptic signal presented and perform the corresponding gesture in response. Also, the access control procedure according to the disclosure does not entail any visual check. An equipment item implementing the disclosure therefore offers the advantage of being accessible to all, particularly to people with poor sight, and in all situations, particularly in situations of use with weak visual control, such as, for example, while walking.

According to a particular embodiment, the method is such that the steps of rendering, detection, and of validation are repeated for a sequence of haptic signals, and that the access authorization step following the validation of said gesture is triggered following the validation of the gesture of response to the last haptic signal of the sequence.

By successively rendering a plurality of haptic signals and by validating each of the responses of the user to these signals before granting access to the terminal, it is possible to reinforce the security by increasing the number of possible combinations. For example, by considering a sequence made up of the successive presentation of five haptic signals, and if, for each of these signals, the gesture of response corresponds to one gesture out of eight predefined gestures (for example a rectilinear displacement of the finger upward, downward, to the left, to the right or along the diagonals), there are 32768 possible combinations.

Finally, the access authorization step occurs only after the validation of the gesture in response to the last haptic signal rendered. This has the effect of making any attempts to discover the gestures associated with the haptic signals by successive tests particularly difficult.

According to one embodiment, the method is such that the sequence of haptic signals is made up of signals selected randomly from the signals that have previously been associated with a gesture.

The order of the signals presented in the sequence is thus variable from one access control procedure to another, which offers the advantage of making the reproduction of the sequence of gestures by imitation when a third party has been able to watch the user executing the procedure unworkable.

In a particular embodiment, the method is such that the gesture associated with the haptic signal is a rectilinear displacement of a contact with a touch surface of the equipment item in a predefined direction.

The user can thus respond to the haptic signal felt by a simple gesture on a touch surface in a direction previously defined for this signal. The fact that a single gesture is associated on the one hand makes it easier for the user to memorize it and on the other hand makes it possible to obtain a rapid unlocking sequence with a low error rate. The touch surface may or may not be combined with the haptic rendering means.

In a particular embodiment, the method is such that the gesture associated with the haptic signal is a movement on three axes detected by an inertial sensor linked to the equipment item.

A user can thus respond to the haptic signal presented by a gesture in three dimensions detected by means of a device suitable for capturing movements on three axes, such as, for example, a connected watch, a sensor that is worn or a mobile terminal equipped with accelerometers and/or gyroscopes. The inertial capture means may or may not be included in the equipment item implementing the method.

According to a particular embodiment, the method is such that a visual index representative of the haptic signal rendered is displayed on a screen of the equipment item.

The user thus has a means for visually identifying the haptic signal rendered, allowing for the terminal to be unlocked for example when the situation does not allow for a recognition of the signal by touch, such as, for example, in the case where an equipment item provided with a touch surface is handled with gloves. If, for example, the haptic signal is a texture made up of vertical grooves, the visual index can be a symbol representing vertical lines.

An exemplary embodiment of the present disclosure also relates to an access control device linked to means for rendering at least one haptic signal and comprising means for:
  Receiving an access request,
  Ordering rendering of a haptic signal,
  Obtaining information on detection of a gesture of response to said signal,
  Validating the gesture of response when the gesture detected corresponds to a gesture previously associated with the haptic signal rendered, and
  Authorizing access following the validation of said gesture.

According to a particular embodiment, the access control device is such that it comprises said means for rendering at least one haptic signal and means for detecting a gesture of response to said signal.

The disclosure relates also to a terminal comprising an access control device as described above.

The disclosure relates also to a computer program comprising instructions for the execution of the access control method as described above, when the program is executed by a processor.

An exemplary embodiment of the present disclosure relates also to a processor-readable storage medium on which is stored a computer program comprising instructions for the execution of the steps of the access control method.

The terminals, devices, programs and storage media offer advantages similar to those of the method described above.

DESCRIPTION OF THE FIGURES

Other features and advantages will become more clearly apparent on reading the following description of a particular embodiment, given as a simple illustrative and nonlimiting example, and the attached drawings, in which.

DESCRIPTION OF A PARTICULAR EMBODIMENT

Figure 1:
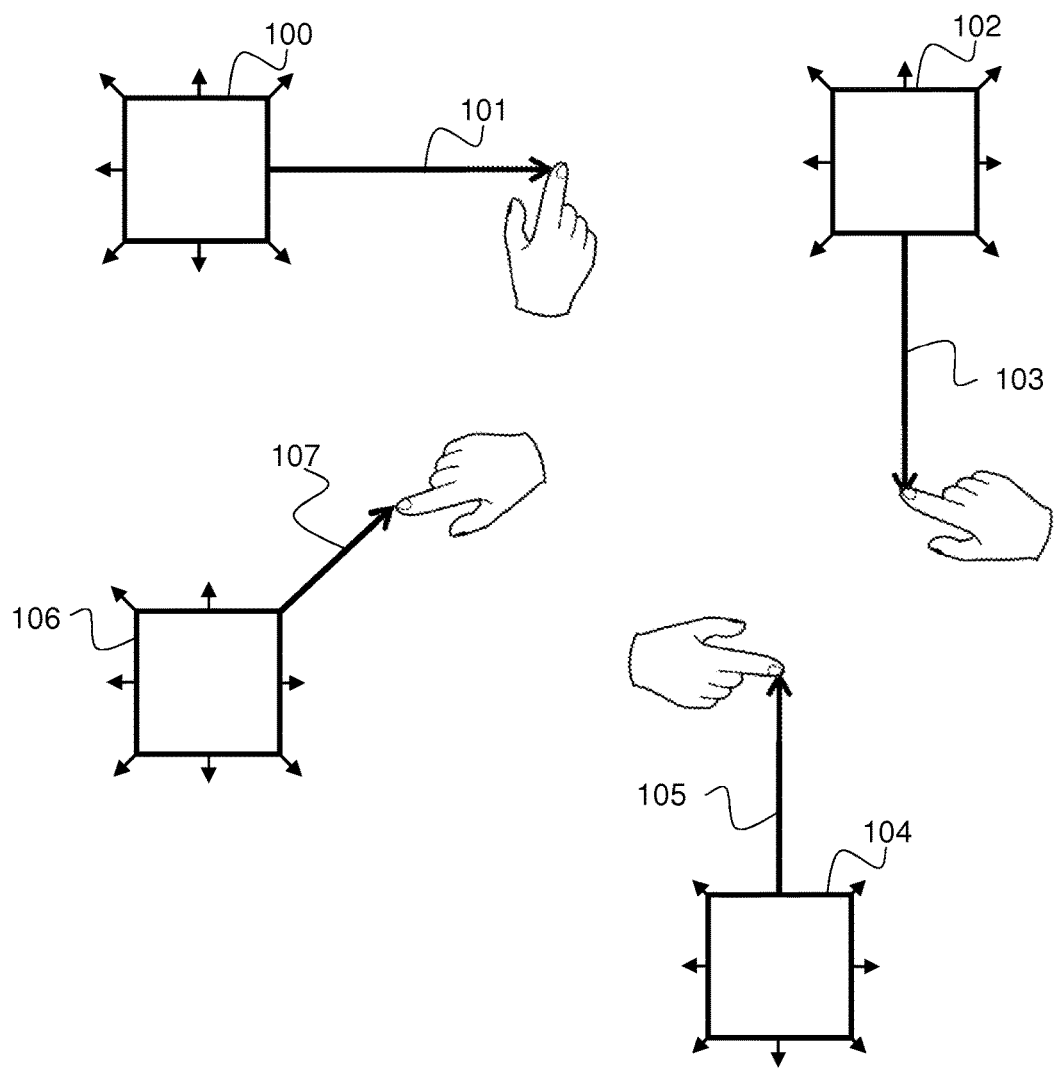
FIG. 1 illustrates examples of associations between haptic signals and gestures for controlling access to a terminal according to one embodiment of the present disclosure.

The following description uses as support a mobile terminal comprising a touch screen and a haptic rendering surface suitable for simulating a texture upon a contact with a part of the body. In the case illustrated here, the touch screen is also the haptic rendering surface. In another embodiment, the two surfaces may be different, for example the haptic rendering surface may be on the back of the terminal. Similarly, the case illustrated here represents a communication terminal, but the one or more aspects of the present disclosure can be implemented on different types of equipment items that can incorporate an access control system and haptic feedback means. It may be, for example and in a nonlimiting manner, a computer, an electronic lock, a connected watch or even an automatic teller machine.

The haptic feedback can, for example, be implemented by the method described in the document U.S. Pat. No. 7,982, 588 B2. However, other haptic rendering technologies can be used to implement aspects of the present disclosure, such as, for example and in a nonexhaustive manner, vibro-touch feedback techniques like those developed by the company Immersion Corporation™, or even screen deformation techniques such as those developed by the company Tactus Technology™ Inc. Generally, any technology that makes it possible to obtain varied touch sensations can be used to implement one or more aspects of the present disclosure.

The terminal also comprises a touch screen making it possible to detect gestures performed by the user, such as, for example, displacements of one or more fingers on the screen. In a preferred embodiment, the haptic rendering surface is combined with the touch screen in such a way as to obtain a touch screen with haptic feedback. However, according to other embodiments, the haptic rendering means need not be combined with a screen. Aspects of the present disclosure can also be implemented on a terminal that does not have a screen.

In a preliminary step, the user associates gestures with haptic signals. For this, the terminal renders a haptic signal, for example a texture, and prompts the user to touch the rendering surface in order to appreciate the texture and learn its characteristics. The terminal can then prompt the user to record a gesture of response associated with this texture. According to a particular embodiment, the terminal offers a predefined set of gestures that can be associated with the texture, such as, for example, displacements in predefined directions. According to another embodiment, the user is free to associate the pattern of his or her choice that he or she describes for example by displacing his or her finger on the screen. According to a particular embodiment, a texture can be discarded when the user judges that it is not sufficiently characterized to be able to be formally identified. According to another particular embodiment, the terminal displays on the screen an image graphically representing the characteristics of the texture so as to provide the user with a visual index when recording the gesture of response.

FIG. 1 illustrates examples of associations between textures and gestures for the unlocking of a terminal according to an embodiment of the present disclosure. In this example, the terminal prompts the user to associate a displacement in a particular direction with each of the textures presented:
  the texture 100 is associated with the gesture 101 corresponding to a displacement of the finger to the right;
  the texture 102 is associated with the gesture 103 corresponding to a displacement of the finger downward;
  the texture 104 is associated with the gesture 105 corresponding to a displacement of the finger upward; and
  the texture 106 is associated with the gesture 107 corresponding to a displacement of the finger along a top right diagonal.

In this example, the gesture corresponds to a displacement in one direction out of eight possible directions. In another embodiment, more complex gestures can be associated with the textures, such as, for example, a circle, a square, a heart, or any pattern that can be reproduced on the touch surface in response to the presentation of a particular texture.

Figure 2:
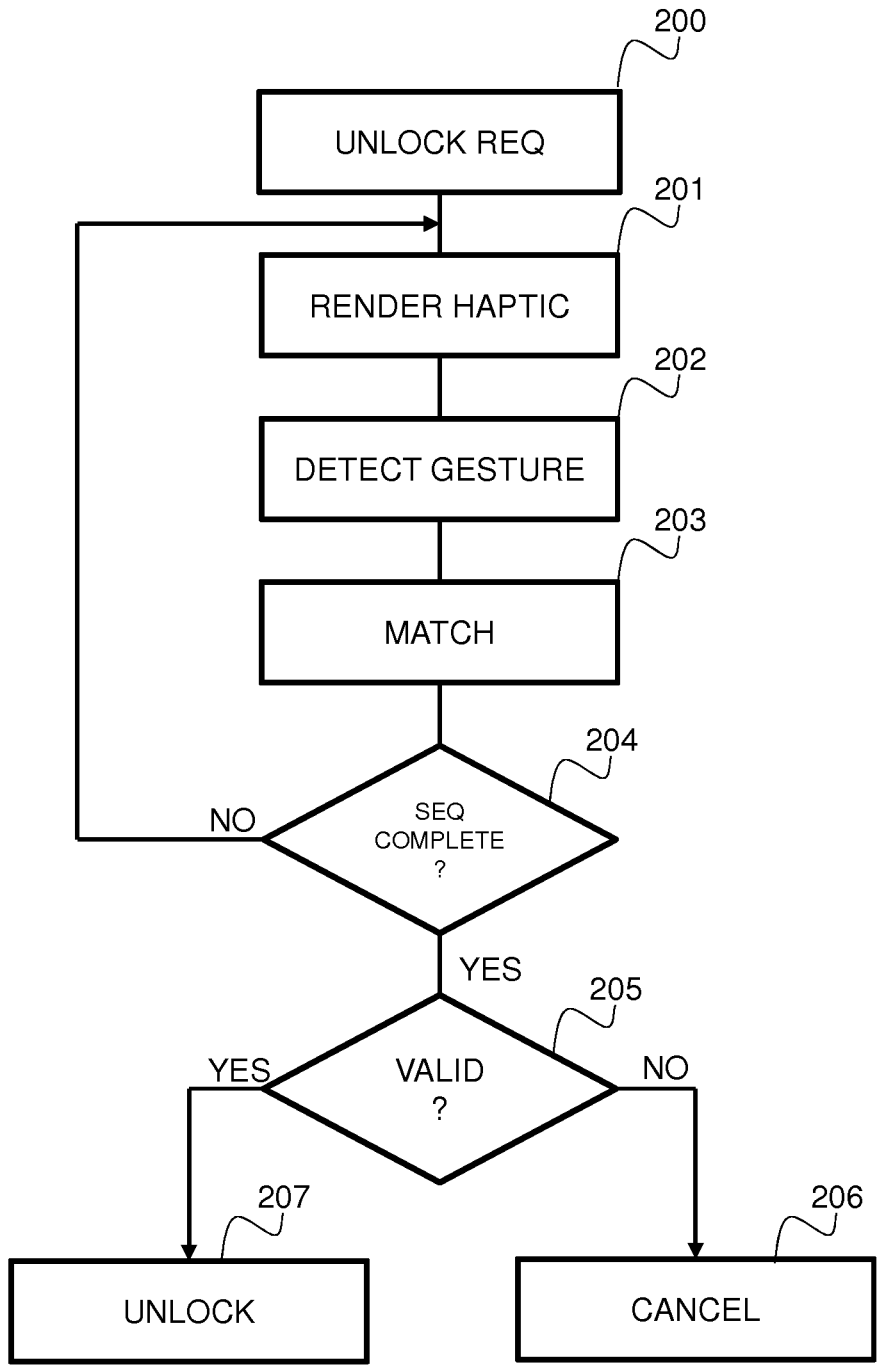
FIG. 2 illustrates the main steps of the access control method according to one embodiment of the present disclosure.

FIG. 2 illustrates the main steps of the access control method according to a particular embodiment of the present disclosure.

In a first step 200, the terminal obtain an access request. This request is obtained for example following an action by the user on the terminal when he or she wants to access protected functions or contents when the terminal is in a locked state. The terminal can then display on the screen a message prompting the user to execute the unlocking procedure by displacing a finger on the screen. In a particular embodiment, the terminal displays a starting point and a direction for this initial gesture.

In the step 201, the terminal renders a haptic signal by presenting, for example, a texture on the haptic rendering surface and prompts the user to perform the gesture that has been previously associated with this texture. The texture can be presented over all of the rendering surface or else only on a predefined area, such as, for example, on the area in contact with the finger of the user, so that the latter can perceive and identify the texture presented.

When the user identifies the texture, he or she performs the gesture which is associated with it, for example a displacement in a particular direction.

In a step 202, the terminal detects the gesture performed by the user in response to the texture presented. The detection is made for example via the touch screen of the terminal. According to another embodiment, the gesture can be detected by a touch device distinct from the screen, such as, for example, a trackpad of a laptop. According to another embodiment, the gesture can be detected by a device distinct from the haptic rendering surface, such as, for example, a motion sensor that is worn (accelerometer, gyroscope) or even a camera.

In the step 203, the gesture of response is then compared to the gesture previously associated with the texture presented to determine the validity of the response provided by the user. The terminal then temporarily memorizes validity information resulting from the comparison so as not to immediately inform the user of any error.

According to a particular embodiment, the terminal reiterates the steps 201, 202 and 203 in order to increase the reliability of the access control. For this, the terminal counts the number of textures presented in an unlocking procedure and compares it, in a step 204, to a predefined number of presentations. Thus, the terminal renews the steps 201, 202 and 203 as long as the number of presentations is less than a predefined number of presentations.

When the predefined number of presentations is reached, the terminal checks the validity of the access in the step 205. For this, the terminal checks that the gestures provided by the user in response to the textures presented do indeed correspond to the gestures previously associated with these textures by using, for example, the validity information stored in the step 203. Thus, when the gestures performed by the user in response to the textures presented and the gestures previously associated with these textures correspond, the terminal can be unlocked in the step 207. On the other hand, if at least one response to a texture presented does not correspond to the gesture previously associated, the access to the terminal is denied in the step 206.

Figure 3A:
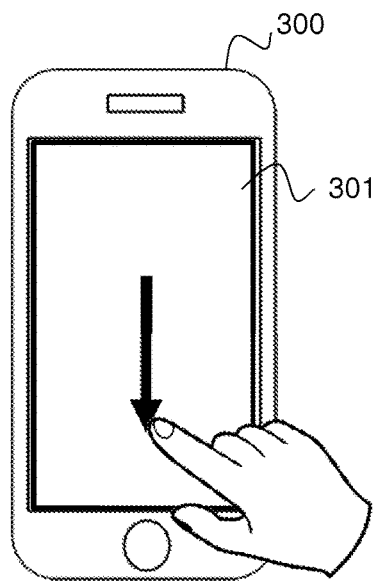
FIGS. 3a, 3b, 3c and 3d illustrate a terminal access control procedure according to a particular embodiment of the disclosure.
Figure 3B:
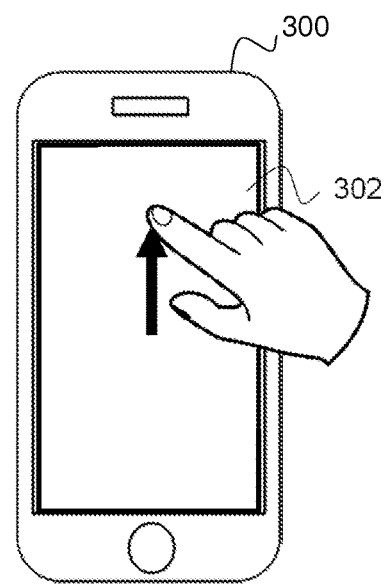
Figure 3C:
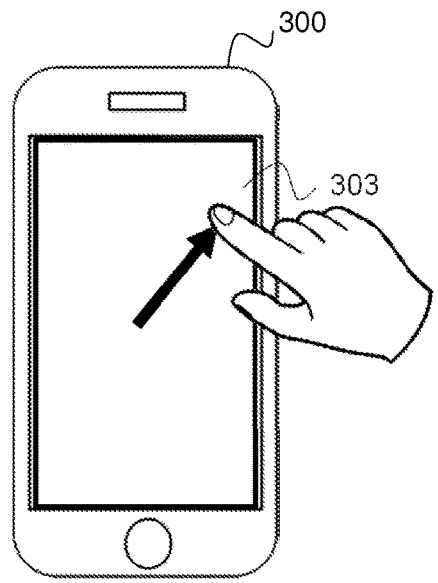
Figure 3D:
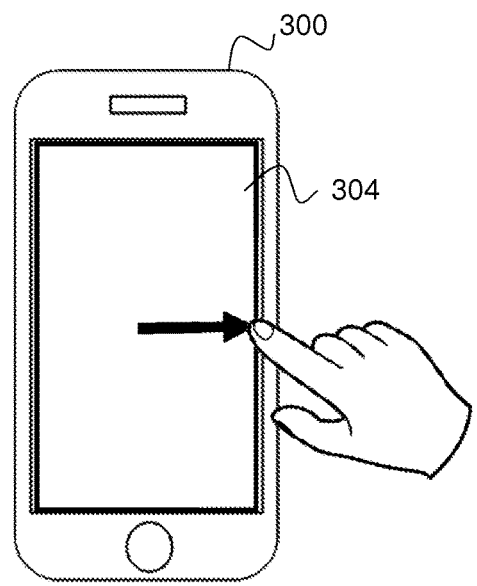

FIGS. 3a, 3b, 3c and 3d illustrate a terminal unlocking procedure according to a particular embodiment of the disclosure. These figures represent a terminal 300 equipped with a touch screen with haptic feedback suitable for rendering a texture over all of the touch surface. The user of the terminal has previously associated gestures and textures, by following, for example, the associations described with reference to FIG. 1. In FIG. 3a, the terminal presents a texture 301 over all of the haptic surface to which the user responds correctly by performing, on the touch screen, a displacement of the finger downward. In FIG. 3b, the terminal presents a new texture 302 over all of the haptic surface. The user responds correctly thereto by performing a displacement of the finger upward. In FIG. 3c, the terminal presents a new texture 303 over all of the haptic surface. The user responds correctly thereto by performing a displacement toward the top right corner. The terminal then presents a texture 304 to which the user responds with the associated gesture, i.e. a displacement to the right. The user has thus demonstrated that he or she knew the gestures associated with the different textures presented and the terminal can grant him or her access to all the functionalities.

In the interests of clarity, the different textures are visually identifiable in FIGS. 3a, 3b, 3c and 3d. However, in a preferred embodiment, the textures presented on the terminal are identifiable only by a touch perception of the haptic signal rendered.

Figure 4:
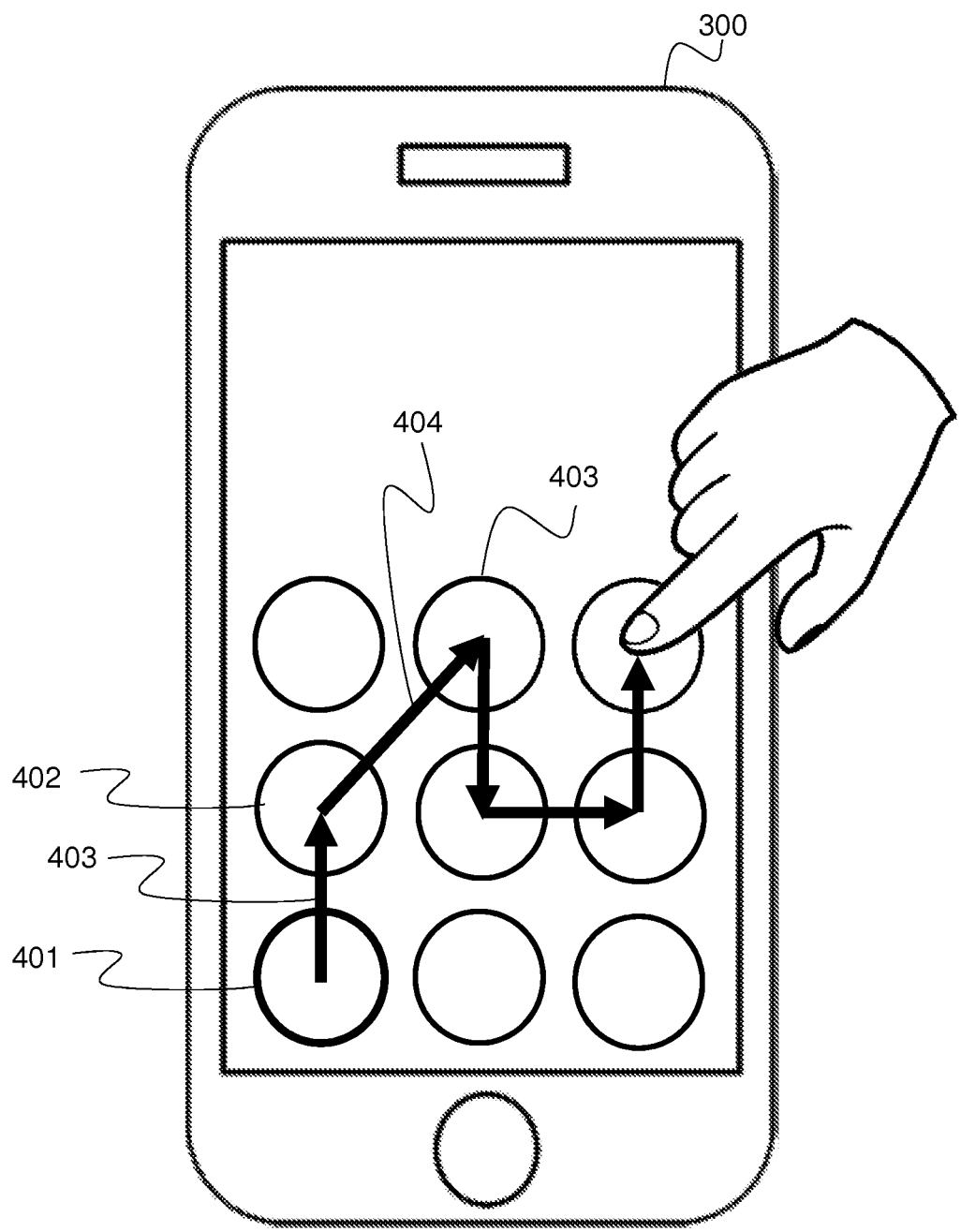
FIG. 4 illustrates a terminal access control procedure according to another particular embodiment of the disclosure.

FIG. 4 illustrates a procedure for unlocking a terminal 300 according to a particular embodiment. In this example, the terminal displays a matrix made up of nine elements, the aim of which is to serve as a guide to the displacements of the finger of the user. The user of the terminal has previously associated gestures with haptic signals, by following, for example, the associations described with reference to FIG. 1.

When the user places a finger on one of the positions of the matrix, for example the position 401, the terminal renders a first haptic signal according to the step 201 described with reference to FIG. 2. For example, the terminal renders the texture 106 of FIG. 1 and prompts the user to displace his or her finger to another position of the matrix in order to be able to feel the texture presented during this displacement. In this example, this first displacement is not performed in response to the haptic signal rendered, its aim being to enable the user to perceive the texture rendered. The user then performs a displacement 403 to the position 402. During this displacement 403, the user perceives and identifies the haptic signal 106 presented by the terminal. When the displacement 403 culminates at the position 402, the terminal renders a new texture, for example the texture 103 represented in FIG. 1 and begins, according to the step 202 of the method, detecting the gesture of response to the texture 106 presented previously. The user then performs a displacement 404 in response to the texture 106 felt in the preceding displacement 403. When the displacement 404 culminates at the position 403, the terminal validates, according to the step 203 of the method, the displacement 404 performed in response to the presentation of the texture 106. A new texture is then presented while the user performs a displacement in response to the texture felt in the displacement 404. In this example, the user must perform four displacements in response to the four haptic signals presented before being allowed access or not in the step 207 of the method.

This embodiment thus enables the user to respond rapidly to a sequence of haptic signals presented by the terminal without lifting the finger from the touch surface.

The order of the haptic signals presented in a sequence can be different from one sequence to another, the choice of the signal to be rendered being able to be random. However, in a particular embodiment, each haptic signal presented in the sequence is selected by the terminal according to the gesture which is associated with it, so that no displacement away from the touch surface is required to execute the unlocking procedure. Thus, when the gesture associated with a randomly selected haptic signal requires a displacement off the touch surface, the terminal can select another haptic signal instead.

Figure 5:
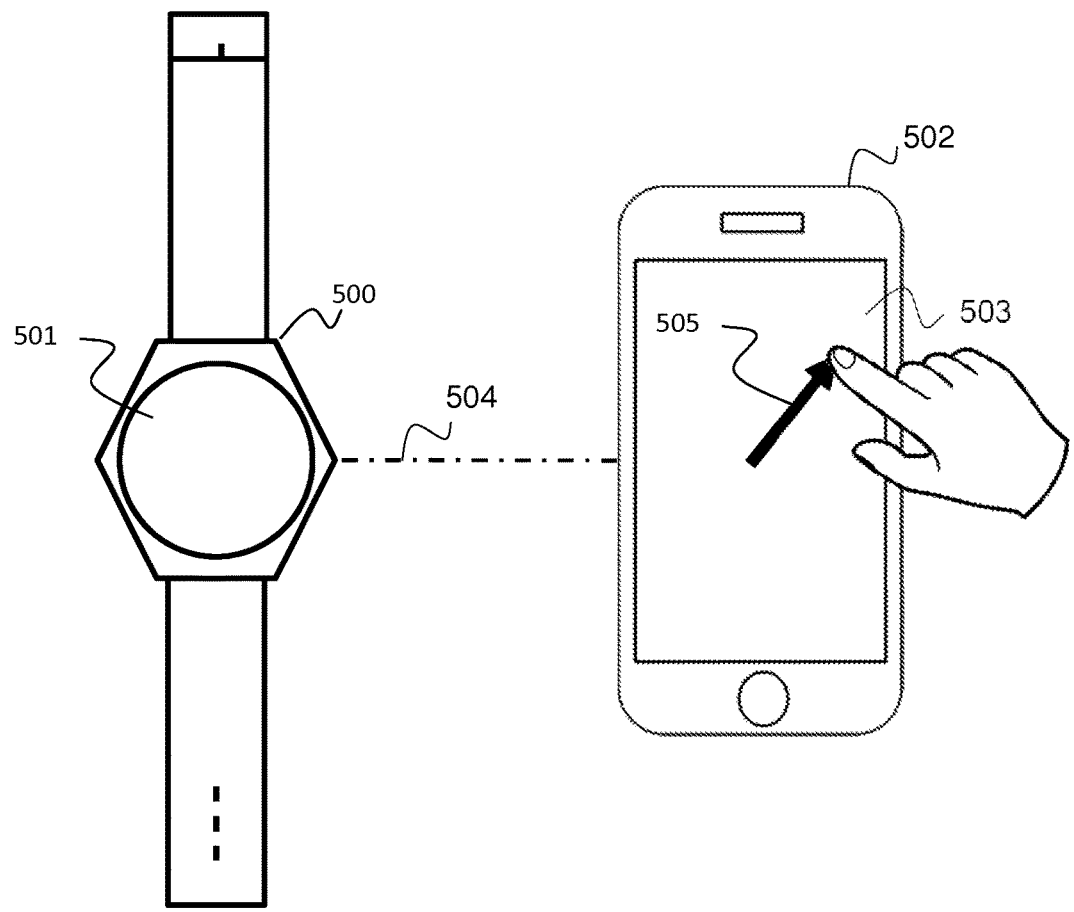
FIG. 5 represents a connected watch having haptic rendering means and a mobile terminal implementing the access control method according to a particular embodiment.

FIG. 5 represents a portable device 500 having haptic rendering means 501. It is, for example, a connected watch having a Bluetooth interface and vibro-touch rendering means suitable for transmitting touch sensations to its wearer. The haptic rendering means 501 are adapted to receive haptic signal rendering commands received via a Bluetooth connection 504. FIG. 5 also represents a mobile terminal 502 implementing the access control method. It is, for example, a mobile terminal of smartphone type provided with a touch screen 503 and a Bluetooth interface suitable for transmitting haptic rendering commands to the connected watch 500 via the Bluetooth connection 504. The touch screen 503 is configured to detect gestures of response to a haptic signal whose rendering has been ordered on the watch 500. The gestures of response can correspond, for example, to a rectilinear displacement of a contact with the screen in a predefined direction, such as, for example, the displacement 505. Thus, when an access request is obtained by the terminal, a haptic signal rendering command is sent to the watch and communicated to its wearer via a touch sensation, such as, for example a particular vibratory sequence. In order to access the functionalities of the terminal, the user performs, on the touch surface of the terminal, the gesture previously associated with the haptic signal rendered. When the terminal obtains the information on detection of the gesture, it performs a comparison with the gesture previously associated with the haptic signal that it has ordered to be rendered on the watch and, if the gestures correspond, allows the user access to the functionalities of the terminal.

Figure 6:
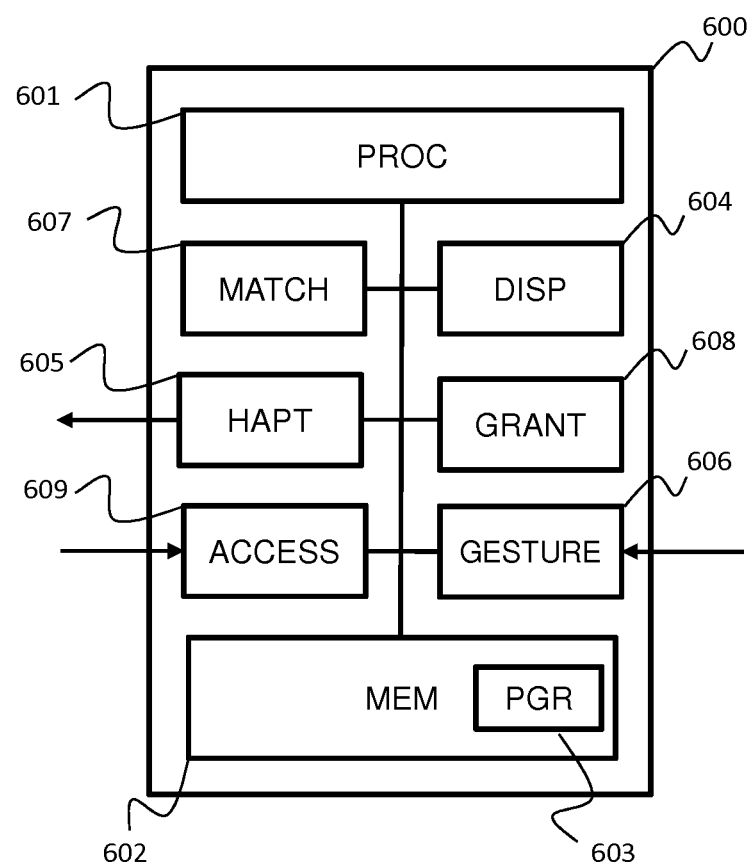
FIG. 6 illustrates the architecture of a device implementing the access control method according to a particular embodiment of the invention.

FIG. 6 illustrates a device 600 implementing the access control method according to a particular embodiment of the disclosure. The device comprises a storage space 602, for example a memory MEM, a processing unit 601 equipped, for example, with a processor PROC. The processing unit can be driven by a program 603, for example a computer program PGR, implementing the access control method as described in the disclosure with reference to FIG. 2, and in particular the steps of obtaining an access request, of ordering rendering of a haptic signal, of obtaining information on detection of a gesture of response to said signal, of validating the gesture of response when the gesture detected corresponds to a gesture previously associated with the haptic signal rendered, and of authorizing access following the validation of said gesture. The memory 602 stores, for example, the associations previously defined between the haptic signals and the gestures.

On initialization, the instructions of the computer program 603 are, for example, loaded into a RAM (Random Access Memory) type memory before being executed by the processor of the processing unit 601. The processor of the processing unit 601 implements the steps of the access control method according to the instructions of the computer program 603.

For this, the device comprises, in addition to the memory 602, haptic rendering control means 605 (HAPT) enabling the device to order the rendering of a particular haptic signal, such as, for example, a texture. The command to render a haptic signal can be, for example, conveyed to the haptic rendering means via a WIFI, Ethernet, Bluetooth interface, a wired connection or even a connection with a communication bus associated with the processing unit. These haptic rendering means can correspond, for example, to vibro-touch feedback means. The device also comprises means 606 (GESTURE) for obtaining information on detection of a gesture of response to a haptic signal which can be, for example, a WIFI, Ethernet, Bluetooth interface, a wired connection or even a connection to a communication bus of the processing unit 601. The means for detecting a gesture of response can correspond to a touch surface, such as, for example, a touch screen, to inertial sensors such as, for example, accelerometers or gyroscopes or even image sensors such as, for example, a video camera. The device further comprises a comparison unit 607 (MATCH) adapted to compare a gesture performed by the user in response to a haptic signal with a gesture previously stored and an access authorization unit 608 (GRANT) adapted to give a user access to the terminal when the gestures performed in response to the haptic signals rendered correspond to the gestures previously associated with the signals. The haptic rendering control means 605 and the means for obtaining information on detection of a gesture 606 of response enable the comparison means 607 to check the validity of a gesture executed by a user in response to a haptic signal presented.

According to a particular embodiment of the disclosure, the device further comprises display means 604 (DISP) such as, for example, a screen making it possible, for example, to display a visual index representative of a haptic signal rendered.

According to a particular embodiment, means for rendering at least one haptic signal and/or means for detecting a gesture of response to said haptic signal are incorporated in the device and connected to a communication bus associated with the processing unit 601.

According to another particular embodiment, the device can be incorporated in a terminal with touch screen of cell phone or tablet type, the touch screen of which can be combined with the haptic feedback means.

According to a particular embodiment, the device can be incorporated in a personal computer by combining, for example, the haptic feedback means suitable for receiving a command to render a haptic signal with a pointing device of trackpad or mouse type.

According to a particular embodiment, the device can be incorporated in a connected watch provided, for example, with a touch area suitable for transmitting information on detection of a gesture of response, such as, for example, a displacement of a contact on the surface, and haptic rendering means adapted to transmit sensations to the wrist of the wearer and to receive a command to render a particular haptic signal.

According to a particular embodiment, haptic signal rendering means suitable for receiving a rendering command can be included on the bottom face of a connected watch and can communicate with the device via a Bluetooth connection.

According to a particular embodiment, the gestures of response to the presentation of a haptic signal can be detected by a sensor that is worn and suitable for transmitting information on detection of a gesture of response, such as, for example, an external device comprising inertial sensors, communicating with the device via a Bluetooth connection.

According to another embodiment, the device can be combined with an electric lock control having a touch area suitable for transmitting information on detection of a gesture of response and haptic feedback means suitable for receiving a command to render a haptic signal in order to control, for example, access to a room or a safe.

According to another embodiment, the device can be incorporated in an automatic teller machine having a touch area suitable for transmitting information on detection of a gesture of response and haptic feedback means suitable for receiving a rendering command.

Although the present disclosure has been described with reference to one or more examples, workers skilled in the art will recognize that changes may be made in form and detail without departing from the scope of the disclosure and/or the appended claims.

The invention claimed is:

1. An access control method on an equipment item linked to elements for rendering at least one haptic signal on a haptic rendering surface, the method comprising, after an access request has been obtained:
    presenting a sequence of haptic signals wherein presenting a single haptic signal of the sequence comprises:
        selecting a haptic signal to be presented among a plurality of haptic signals, each of the plurality of haptic signals being previously associated with a respective gesture on a touch screen, the association being stored in a non-transitory computer-readable medium, wherein the selected haptic signal is selected according to the respective gesture and as a function of whether the respective gesture would require a displacement away from the touch screen when performed from a current touch location on the touch screen, and wherein the selected haptic signal is selected so that no displacement away from the touch screen is required to execute an unlocking procedure of the equipment by performing the respective gesture from said current touch location,
        generating a command to render the selected haptic signal on the haptic rendering surface, wherein the selected haptic signal is a touch-discernible texture and transmitting the command to the elements for rendering the selected haptic signal, and the selected haptic signal is rendered during the performance of a gesture of response to a haptic signal presented previously in the sequence,
        obtaining information on detection of a gesture of response to said selected haptic signal, from said touch screen,
        validating the gesture of response when the information on detection corresponds to the respective gesture previously associated with the selected haptic signal,
        wherein the gestures of response corresponding to the presented haptic signals are performed sequentially without lifting the finger from the touch surface, and
    authorizing access to the equipment item if a valid gesture is detected for each haptic signal presented in the sequence.

2. The method according to claim 1, wherein selecting comprises:
    selecting randomly each haptic signal in the sequence of haptic signals from the plurality of haptic signals that have previously been associated with respective gestures, and
    if the respective gesture of the randomly selected haptic signal requires a displacement from the touch screen to perform the gesture from the current location, selecting instead another haptic signal randomly from the plurality of haptic signals so that the randomly selected haptic signal requires no displacement from the touch screen to perform the respective gesture from the current location.

3. The method according to claim 1, wherein the gesture associated with the selected haptic signal is a rectilinear displacement of a contact with the touch screen of the equipment item in a predefined direction.

4. The method according to claim 1, wherein the gesture associated with the selected haptic signal is a movement on three axes detected by an inertial sensor linked to the equipment item.

5. The method according to claim 1, further comprising displaying a visual index representative of the selected haptic signal on a screen of the equipment item.

6. An access control device, linked to elements for rendering at least one haptic signal, the access control device comprising:
  a non-transitory computer-readable memory comprising instructions stored thereon;
  a processor, which is configured by the instructions to perform acts of:
    presenting a sequence of haptic signals wherein presenting a single haptic signal of the sequence comprises:
      selecting a haptic signal among a plurality of haptic signals, each of the plurality of haptic signals being previously associated with a respective gesture on a touch screen, wherein the selected haptic signal is selected according to the respective gesture and as a function of whether the respective gesture would require a displacement away from the touch screen when performed from a current touch location on the touch screen, and wherein the selected haptic signal is selected so that no displacement away from the touch screen is required to execute an unlocking procedure of the equipment using the respective gesture from said current touch location,
      generating a command to render the selected haptic signal on the haptic rendering surface, wherein the selected haptic signal is a touch-discernible texture and transmitting the command to the elements for rendering the selected haptic signal, the selected haptic signal is rendered during the performance of a gesture of response to a haptic signal presented previously in the sequence
      obtaining information on detection of a gesture of response to said selected haptic signal, from said touch screen,
      validating the gesture of response when the information on detection corresponds to the respective gesture previously associated with the selected haptic signal,
    wherein the gestures of response corresponding to the presented haptic signals are performed sequentially without lifting the finger from the touch surface, and
  authorizing access to the equipment item if a valid gesture is detected for each haptic signal presented in the sequence.

7. The access control device according to claim 6, wherein the device further comprises said elements for rendering at least one haptic signal and said touch screen.

8. A terminal comprising the access control device according to claim 6.

9. A non-transitory processor-readable storage medium on which is stored a computer program comprising instructions for execution of an access control method performed on an equipment item linked to elements for rendering at least one haptic signal on a haptic rendering surface, the method comprising, after an access request has been obtained:
  presenting a sequence of haptic signals wherein presenting a single haptic signal of the sequence comprises:
    selecting a haptic signal among a plurality of haptic signals, each of the plurality of haptic signals being previously associated with a respective gesture on a touch screen, wherein the selected haptic signal is selected according to the respective gesture and as a function of whether the respective gesture would require a displacement away from the touch screen when performed from a current touch location on the touch screen, wherein the selected haptic signal is selected so that no displacement away from the touch screen is required to execute an unlocking procedure of the equipment using the respective gesture from said current touch location,
    generating a command to render the selected haptic signal on the haptic rendering surface, wherein the selected haptic signal is a touch-discernible texture and transmitting the command to the elements for rendering the selected haptic signal, and the selected haptic signal is rendered during the performance of a gesture of response to a haptic signal presented previously in the sequence
    obtaining information on detection of a gesture of response to said selected haptic signal, from said touch screen,
    validating the gesture of response when the information on detection corresponds to the respective gesture previously associated with the selected haptic signal,
  wherein the gestures of response corresponding to the presented haptic signals are performed sequentially without lifting the finger from the touch surface, and
  authorizing access to the equipment item if a valid gesture is detected for each haptic signal presented in the sequence.

* * * * *